United States Patent [19]

Hegyi

[11] Patent Number: 4,636,092
[45] Date of Patent: Jan. 13, 1987

[54] DIODE THERMOMETER

[76] Inventor: Dennis J. Hegyi, 1512 Morton Ave., Ann Arbor, Mich. 48104

[21] Appl. No.: 746,005

[22] Filed: Jun. 18, 1985

Related U.S. Application Data

[63] Continuation-in-part of Ser. No. 622,040, Jun. 19, 1984, abandoned.

[51] Int. Cl.$^4$ .......................... G01K 7/16; G01K 7/00
[52] U.S. Cl. .................................... 374/178; 307/310; 374/170; 374/172; 374/183
[58] Field of Search ............... 374/170, 171, 172, 173, 374/178, 183; 307/310

[56] References Cited

U.S. PATENT DOCUMENTS

| | | | |
|---|---|---|---|
| 3,609,728 | 9/1971 | Quinn | 374/183 |
| 3,812,717 | 5/1974 | Millen et al. | 374/178 |
| 3,978,325 | 8/1976 | Goldstein et al. | 374/170 |
| 4,165,642 | 8/1979 | Lipp | 374/178 |
| 4,228,684 | 10/1980 | Templin | 374/178 |
| 4,418,339 | 11/1983 | Spofford, Jr. et al. | 374/178 |
| 4,448,549 | 5/1984 | Hashimoto et al. | 374/178 |
| 4,497,586 | 2/1985 | Nelson | 374/178 |

Primary Examiner—Charles Frankfort
Assistant Examiner—Thomas B. Will
Attorney, Agent, or Firm—Rohm & Monsanto

[57] ABSTRACT

A diode thermometer wherein a current source is operated to cause a temperature sensing diode to be subjected to operation at a first current level and then a second current level different from the first current level. A voltage generated from the diode by the switching of the current is applied to a circuit which up integrates the voltage for a certain time interval at the conclusion of which a known reference voltage is applied to the integrator, of opposite sense to the previous signal so that the integrator now integrates in the opposite direction. A capability is provided such that the integrator starts from a zero reference level when it begins to integrate, and when it is integrating the known reference signal it returns toward this zero reference. A comparator detects return of the integrator output signal to the zero reference. A counter circuit is gated to count clock pulses during the time that the integrator integrates the known reference until the comparator detects return of the integrator output signal to the zero reference level. The count in the counter is therefore representative of the sensed temperature, and the measurement is free of influences attributable to the diode and/or the circuit, which otherwise might impair the accuracy of the measurement. Techniques are also disclosed for presenting the measurement in terms of a particular temperature scale.

21 Claims, 7 Drawing Figures

DIODE THERMOMETER

This application is a continuation-in-part, of application Ser. No. 622,040, filed 6/19/84 now abandoned.

BACKGROUND AND SUMMARY OF THE INVENTION

This invention relates generally to thermometry, and more particularly, to improvements in a device commonly known as a diode thermometer, and circuitry associated therewith.

Electrical circuit components typically exhibit electrical characteristics which are temperature related. Hence, it is possible to use an electrical or electronic circuit component as a temperature sensor and to extract a measurement of temperature from the component by monitoring an electrical characteristic, provided that a correlation of the electrical characteristic with temperature is known. An example of a device of this type is commonly known as a diode thermometer.

In a solid state diode, semiconductor materials are arranged to provide an electrical characteristic which exhibits very high forward conductivity and extremely low reverse conductivity. In the conventional diode thermometer which operates at constant current, the voltage developed across the diode is related to temperature. Conventional diode thermometers have several disadvantages:

(1) the diode voltage is not precisely linearly related to temperature even for an ideal diode;

(2) at the same current and temperature, different diodes develop different voltages to the extent that diodes used in conventional diode thermometers must be individually calibrated, variations of ±50 degrees are typical; and (3) the electrical properties and hence calibration of conventional diode thermometers change with time and thermal history.

One known temperature transducer arrangement which overcomes some of the problems in the prior art is described in U.S. Pat. No. 3,430,077 which issued to Bargen. This reference shows a semiconductor device having more than one junction and which is energized by a current having an alternating characteristic. In this manner, the effects of leakage currents and recombination currents are reduced. Also, if the junction is operated forward biased, with a forward voltage which exceeds approximately 0.1 volt, the change in voltage resulting from the various current levels is mathematically directly proportional to the absolute temperature.

U.S. Pat. No. 4,165,642 describes a monolithic integrated CMOS circuit which provides at its output a digital signal responsive to temperature. This known temperature sensing arrangement is of the bipolar bandgap reference type in that it requires two matched bipolar transistors. Such transistors must be matched in terms of areas of the junctions, doping densities, doping profiles, aging effects, and transistor temperatures. Commercially available systems which utilize this known concept typically produce chip-to-chip variations which result in temperature measurement variations of ±/−5° C. There is clearly a need for a temperature measuring system having greater accuracy.

A system wherein a digital signal is scaled to correspond selectably to Celsius and Fahrenheit values is described in U.S. Pat. No. 4,370,070. In accordance with the teachings of this patent, the conversion from Farenheit to Celsius is achieved by dropping four of each nine counts to an accumulating counter. This is equivalent to multiplying by 5/9. Such counts are obtained from a temperature oscillator which generates a train of pulses at a frequency which is related to the sensed temperature. Also, the system described in this reference assumes linearity of the output of a thermistor with respect to temperature.

It is, therefore, an object of this invention to provide a simple and inexpensive temperature measuring arrangement.

It is another object of this invention to improve the accuracy with which temperature is measured.

It is also an object of this invention to provide a temperature measuring arrangement which can easily be produced as an integrated circuit.

It is a further object of this invention to provide a temperature sensing system which does not require matching of solid state devices at the sensor to achieve high accuracy.

It is additionally an object of this invention to provide an integrated circuit temperature sensing system which utilizes differential current values to achieve temperature measuring.

It is yet another object of this invention to provide a system wherein precisely accurate differential currents are generated.

It is a still further object of this invention to provide a temperature measuring arrangement wherein the effects of noise are substantially reduced.

It is an additional object of this invention to provide a CMOS integrated circuit wherein 1/f noise is substantially reduced.

It is still another object of this invention to produce a temperature measuring system which utilizes a down integrator having an extended dynamic range.

It is a yet further object of this invention to provide a temperature measuring system which achieves high accuracy and resolution without the need for calibration using water baths.

It is additionally a further object of this invention to provide a high accuracy temperature measuring system which does not require an amplifier having precisely predetermined gain.

The foregoing and other objects are achieved by this invention which provides a temperature sensing system having a solid state temperature sensor having a junction for developing a junction voltage thereacross. The junction voltage is responsive to a current which is conducted through the sensor, and is at least partially responsive to the temperature of the sensor. The current is generated by a current source, or generator, at first and second current levels so that the junction voltage varies correspondingly. A voltage value storage arrangement stores, in one embodiment, at least two junction voltage values. Such stored junction voltage values are received by a measurement arrangement which produces a signal responsive to the junction voltage values and the temperature of the sensor.

In one embodiment of the invention, the junction voltage values are stored in sample-and-hold devices which are controlled by a controller which may be a programmable system, such as a microcomputer. The values stored in the sample-and-hold devices are converted into a difference signal which is then integrated by an integrator. In a preferred embodiment, the integrator is of the type which integrates bidirectionally. The integration in one direction, illustratively a down integration, is timed. This results in a timing signal which corresponds accurately to the temperature of the solid state temperature sensor.

An auto-zero system is coupled to the integrator to assist in establishing a reference value for the integration. Additionally, this system functions to compensate for any offset voltage of the circuitry. Thus, if the junction difference voltage is zero, then the auto-zero circuit will cause the output of the integrator not to change with time.

In accordance with a further embodiment of the invention, a comparator is provided for receiving at respective inputs thereof signals from the integrator and the auto-zero system. The output of the comparator is conducted to the controller for indicating to the controller the duration of the timing interval. In addition, the controller is provided with means for scaling the number of clock pulses which are accumulated in a counter so as to provide counts which correspond to Fahrenheit and Celsius measurements.

The accuracy of the temperature measurements is improved in highly advantageous embodiments of the invention by providing a switching arrangement wherein minor matching errors in a plurality of current sources which provide the multilevel current are reduced by averaging them amongst themselves. This is achieved by providing n such current sources, each with an associated switch which may be controlled by the controller. When a high current level is to be conducted, all n switches are closed. When a low current is to be conducted, only one such switch is closed, thereby maintaining a current ratio of n:1 between the high and low levels. Preferably, various ones of the n switches are sequentially closed during conduction of the low level current to ensure that mismatches in the magnitude of the currents produced by the various current sources are averaged out.

In accordance with a method aspect of the invention, a temperature measurement is achieved by alternatingly conducting a current through a solid state sensor at first and second current levels; sampling and storing correspondingly produced voltages of the solid state sensor; producing a signal which corresponds to the difference between the correspondingly produced voltages; and integrating the difference signal.

In one embodiment, at least a portion of the period of time during which the integration occurs is measured to produce a timing signal which corresponds to the temperature of the sensor. In a specific illustrative embodiment of the invention such timing incorporates the steps of gating a clock signal to a counter, so as to count clock pulses, and preloading the counter with values which depend on whether the temperature is desired to be measured with Fahrenheit or Celsius scales.

In an integrated circuit embodiment of the invention, a temperature measurement system which can provide a readout in units as small as 0.1 degrees would require an operational amplifier having precisely predetermined gain. Such precision can be achieved, in accordance with the invention, by switching identical resistors so that all such resistors are used for the input and feedback loop during each measurement cycle. Alternatively, such switching can be used for capacitors. Thus, any mismatches are averaged out in a manner similar to that described hereinabove with respect to the current sources.

In accordance with a significant aspect of the invention, the disadvantageous effects of various types of noise are substantially reduced. There are essentially three types of noise which affect the precision to which the temperature can be measured. These include, synchronous noise, white noise, and 1/f noise. Synchronous noise results from pick-up from the clock and any circuit elements which are triggered thereby. To eliminate synchronous noise, it is essential that the clock and its associated synchronous circuitry pass through the various logic states as contemporaneously as possible. For example, the auto-zero phase should be identical to the measurement phase. Thus, the output of the differential amplifier which subtractively combines the outputs of the sample-and-hold devices will cancel out the synchronous noise.

White noise can be reduced to a relatively low level by sampling the voltage difference for a sufficiently long period of time. Thus, this type of noise must be taken into consideration in determining the maximum sampling speed when practicing the invention.

The third type of noise, 1/f, is more complicated than the other two and is particularly acute in CMOS integrated circuit embodiments of the invention. The contribution of 1/f noise does not depend on the duration of the sampling time interval, but rather on Q, the ratio of the time interval between the end and start of consecutive sample-and-hold time windows, to the total time interval beginning with the start of a first sample-and-hold window and the end of a second such window. In other words, 1/f noise depends upon the ratio of the time between two samples to the total sampling period including the time between the two samples. It is assumed, for purposes of this disclosure that the output of the sample-and-hold is the average value of the input voltage during the sampling window. It can be shown that the more fundamental quantity, the signal-to-noise ratio is proportional to the square of the quantity 1-Q for small Q values. Therefore, in order to keep the signal-to-noise ratio from being degraded by approximately 50%, it is necessary to keep Q to less than 0.25. It is therefore necessary that the sample-and-hold circuitry be designed such that Q is less than 0.25, and preferably as small as possible, because the contribution of 1/f noise to the differentially sampled voltage, which yields the measured temperature value, depends upon the amplitude of the 1/f noise and on Q. It should be noted that the amplitude of the 1/f noise is not controlled easily by the practitioner of the invention. However, for a given amplitude of 1/f noise, if reducing Q to near zero does not reduce the noise in the measurement of the temperature to a sufficiently small value to achieve the desired measuring precision, it is nevertheless possible to reduce the noise to an acceptable level by adding together several differential samples of the temperature. The noise decreases as the reciprocal of the square root of the number of samples of the temperature added together. For example, adding 100 samples reduces the 1/f noise by a factor of 10, relative to a single differential sample. Such averaging is easily achieved during up integration in a dual slope integrator. It may also be achieved digitally by averaging the final digitized temperatures. Such averaging will reduce almost all types of noise.

In accordance with a further aspect of the invention, a third sample-and-hold device is connected to the output of the differential amplifier for for storing the difference voltage while the first and second sample-and-hold devices store values for the next sample period. Thus, the efficiency of operation of the temperature measuring system is improved.

In an operational cycle of a specific illustrative embodiment of the invention, the first step is to determine the auto-zero value of the system, so as to correct for errors such as operational amplifier errors and the non-linearities of various circuit components which cause a zero signal voltage to result in a nonzero value of the temperature. Such auto-zeroing occurs during a time period which is a significant fraction of an entire measurement cycle, illustratively ⅛ to ½ of the whole cycle. Before the first samples of the voltage are made by the sample-and-hold devices, the integrator, which for the sake of simplicity has been designed so as to accept only positive values, must be initialized. This is required because the output of the difference amplifier could be either positive or negative. Such initialization can be achieved by requiring the integrator to integrate upwardly on a positive voltage which is greater than all of the charge which could be deposited by any possible offset voltages developed in the system, and which is stable for at least one measurement cycle.

After the foregoing initialization, the lower of the two current levels is conducted through the sensor and the first and second sample-and-holds are strobed in their normal fashion so that Q is less than 0.25. During the auto-zero cycle the sensor current is not switched. The resulting difference value is then strobed into the third sample-and-hold, which is coupled to the integrator until the next operation of the first and second sample-and-hold devices. The cycle is continued for the remainder of the auto-zero cycle. For an analog auto-zero embodiment, the voltage applied to the positive input of the integrator is adjusted until the output of the integrator does not change with time, and the comparator is adjusted to switch states at this voltage. Also, the same voltage is maintained on the positive terminal of the integrator as well as the comparator during the temperature measurement period. For a digital auto-zero circuit, the final step in the auto-zero cycle is to down integrate on the reference voltage in the normal fashion. The number of clock pulses occurring during the down integration is stored for later use.

The next step in the cycle is to measure temperature. The low current level is conducted through the sensor and the first sample-and-hold is strobed. Subsequently, the high current is conducted and the second sample-and-hold is strobed after the switching transient has settled. The differential sample is then strobed into the third sample-and-hold, and it is coupled to the integrator. The cycle is repeated for the duration of the up integration. Since the first and second sample-and-holds will quickly charge to their final states, assuming that the temperature is not changing rapidly, the transient will not be important, and the time between samples can be made quite short.

In a still further embodiment, the dynamic range of the integrator is increased. The range of an up-down integrator is determined by the ratio of the maximum voltage thereacross to the size of the least significant bit. The prior art has encountered difficulty in building an integrator with a range greater than 1000, or with more than 10 bits resolution. In the present invention the range of the integrator is increased by integrating up and down several times in one cycle, and counting the total number of counts separately for the up and down integrations. The dynamic range is therefore increased severalfold.

The present invention, as noted herein, is directed to a new and unique solid state thermometer system wherein the measurement of sensed temperature is obtained essentially free of the undesired properties which plaque know systems. The present invention thereby provides a temperature signal which is indicative of the true temperature alone, essentially free of other influences which affect a diode's electrical characteristic, and in addition, that signal is linearly related to temperature. This offers significant advantages not only for the diode thermometer itself but also for its method of manufacture. Because a diode thermometer embodying principles of the present invention eliminates the effect of these other influences, it means that diodes do not have to be matched to the associated circuitry nor does there necessarily have to be an adjustment in the circuitry to compensate for a particular characteristic of a diode which is used with the circuitry. Also, circuitry to correct for the non-linearity of a conventional diode thermometer is unnecessary. Hence, reliability, accuracy, and simplification in manufacturing procedures are some of the important attributes of the invention.

The invention is also well suited for manufacture in integrated circuit form by using integrated circuit fabrication technology. This means that the invention can be packaged in a commercial form as an integrated circuit "chip", another very attractive attribute of the invention. The principles of the invention, however, may be applied to circuits which are in other than integrated circuit form. Thus, the present invention enhances a diode thermometer in a number of important ways, with particular reference to linearity, accuracy, reliability, packaging, and manufacturing.

BRIEF DESCRIPTION OF THE DRAWINGS

Comprehension of the invention is facilitated by reading the following detailed description in conjuntion with the annexed drawing, in which.

DETAILED DESCRIPTION

Figure 1:
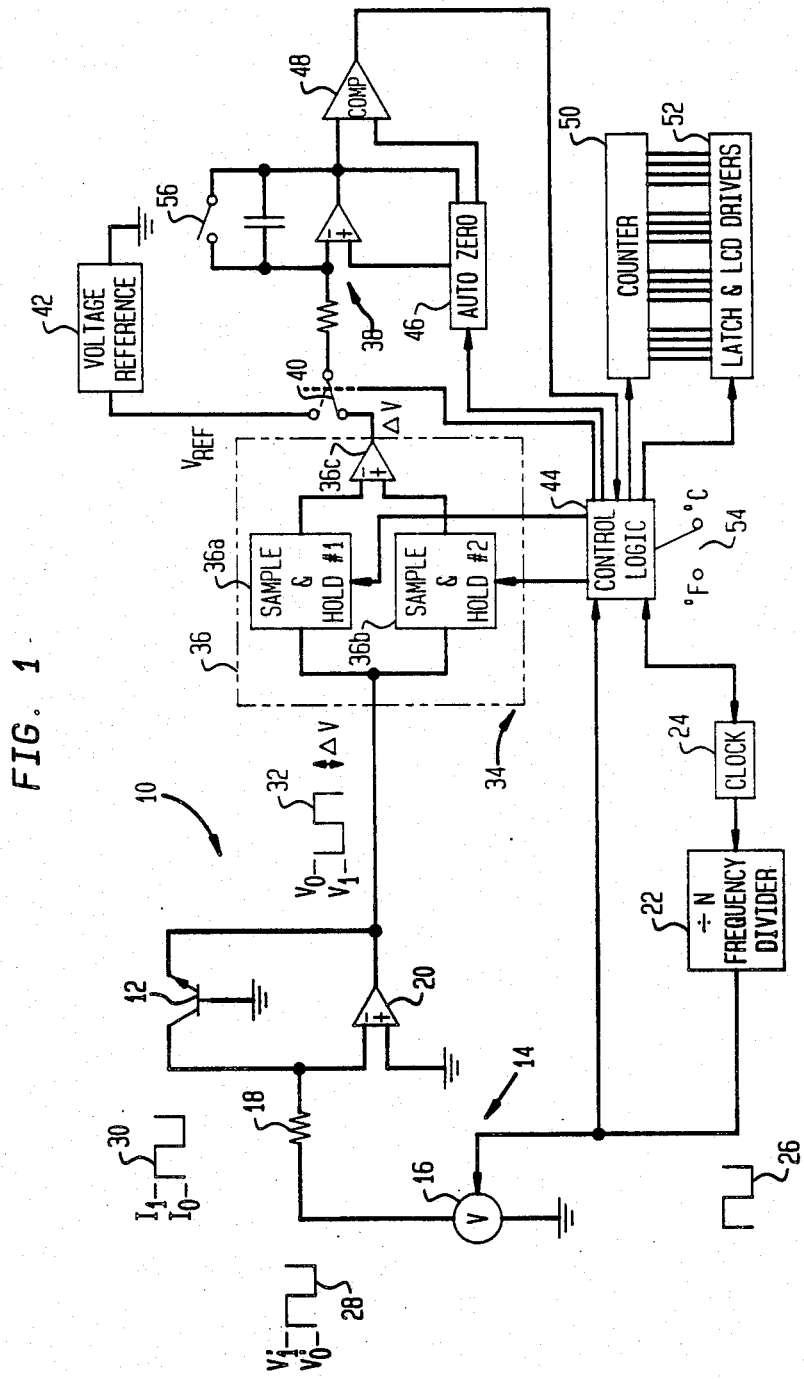
FIG. 1 is a schematic representation of a temperature measuring arrangement constructed in accordance with the principles of the invention.

FIG. 1 illustrates a preferred embodiment of diode thermometer 10 embodying principles of the present invention. The preferred temperature sensing device which is used in thermometer 10 is a transistor 12. It will be recognized that the transistor is constructed of semiconductor materials which provide a diode characteristic and hence for purposes of the present invention in fact is considered as a diode. The use of a transistor, as distinguished from a diode, is preferred because the transistor exhibits a characteristic which is a better approximation to that of an ideal diode than does a two-terminal solid state diode itself.

Thermometer 10 further includes an input circuit, generally 14, operatively associated with transistor 12. This input circuit forms a current source for transistor 12 and, in operation of the thermometer, switches between two current levels, typically differing by a factor of ten.

The illustrated input circuit 14 comprises a voltage source 16 and a series resistance 18 operatively connected with transistor 12 in the manner schematically shown in the drawing figure. An operational amplifier 20 is also cooperatively associated with these components, as shown.

Voltage source 16 is cooperatively associated with a frequency divider circuit 22 and a clock circuit 24. Frequency divider circuit 22 develops a square wave output signal represented by a waveform 26. This waveform acts upon voltage source 16 to cause the voltage source to develop a voltage which is represented by a waveform 28. For purposes of explanation, waveform 28 is a square wave at the same frequency as waveform 26, switching between voltage levels $V'_0$ and $V'_1$.

The application of voltage waveform 28 in input circuit 14 causes a current flow through the collector-emitter path of transistor 12 which switches between current levels $I_0$ and $I_1$. As a consequence of circuit's 14 operation, the current waveform, which is thus at the same frequency as waveforms 26 and 28, is identified by the reference numeral 30.

As a consequence of input circuit's 14 operation, a voltage waveform which appears at the junction of the output of operational amplifier 20 and the emitter of transistor 12 is a waveform 22 which is at the same frequency as the preceding waveforms and which switches between voltage levels $V_0$ and $V_1$. Since it is the voltage difference which will be of interest in obtaining the temperature measurement, this parameter is conveniently identified by the reference $\Delta V$.

The signal $\Delta V$ is proportional to, and therefore represents, the absolute temperature measurement. The remainder of the circuit is a particular analog-to-digital (A to D) converter which possesses the ability to present the temperature measurement in particular ways.

The $\Delta V$ signal waveform 32 is supplied to the A to D converter circuit, designated by the general reference numeral 34. Specifically waveform 32 is supplied as an input to a circuit 36, a dual sample and hold circuit with a difference amplifier. The two sample and hold circuits are identified as 36a and 36b while the difference amplifier is designated as 36c. In operation, one sample and hold circuit serves to record $V_1$ and the other $V_0$. The output of amplifier 36c is the difference $V_1-V_0$.

An up-down integrator circuit 38 is operatively coupled with circuit 36 through a two-pole switch 40. With switch 40 in the position illustrated in the drawing figure, the signal $\Delta V$ from circuit 36 is supplied to up-down integrator circuit 38. When switch 40 is operated to the broken line position, a voltage reference 42 is connected to the up-down integrator circuit instead of the signal from circuit 36. The voltage reference is a constant magnitude $V_{ref}$.

Switch 40 is under the control of a control logic circuit 44. Thus, the input to integrator circuit 38 at any given time is either the output $\Delta V$ from circuit 36 or the voltage $V_{ref}$ from voltage reference 42 depending upon the position to which switch 40 is operated by control logic circuit 44. In this regard, switch 40 may comprise any suitable device, either electromechanical or electronic, preferably the latter. Integrator circuit 38 operates upon the input signals supplied to it in a manner which will be described in detail later on. Also to be described is an auto zero circuit 46 cooperatively associated with integrator circuit 38.

The output of integrator circuit 38 is supplied as an input to a comparator 48. The output of comparator 48 is in turn coupled to control logic circuit 44. Control logic circuit 44 also receives the clock signal from clock circuit 24.

Control logic circuit 44 forms an operative coupling with a counter 50. Latch and LCD drivers, generally 52, are operatively associated with counter 50 and control logic circuit 44 to provide a store of measurement obtained from counter 50. Counter 50 provides the temperature measurement. In the embodiment illustrated in the drawing, the latch and LCD drivers circuit 52 is employed to drive a visible display (not shown). It will be appreciated however that the measurement which is representative of sensed temperature may be used for any particular purpose or purposes desired, including display and/or control function purposes.

With this general description of diode thermometer 10 in mind, the reader can now direct attention to consideration of more specific details.

The purpose of circuit 36 is to provide an output signal $\Delta V$. The auto zero circuit 46 is defined to perform a calibration to compensate for the non-ideal characteristics of the electronic devices such that it is actuated when the output voltage $\Delta V$ of circuit 36 is zero, and switch 40 is in the position coupling the output of circuit 36 to integrator circuit 38, to cause the output of integrator circuit 38 to be constant. In other words, for $\Delta V=0$ ($I_1=I_2$) the auto zero causes the output signal of integrator circuit 38 to be invariant.

In this way the $I_1$ current, corresponding to the $V_1$ voltage level of waveform 32, constitutes a reference. Switching of the transistor current from $I_1$ to $I_0$ causes a change in voltage signal from $V_1$ to $V_0$.

Control logic circuit 44 operates the two sample and hold circuits 36a and 36b such that when the transistor current is $I_1$, the $V_1$ voltage is sampled by both circuits 36a and 36b. Consequently the output of difference amplifier 36c is zero. At this time auto zero circuit 46 is actuated as described above.

Now when the voltage waveform 32 switches from $V_1$ to $V_0$, the $V_1$ signal is retained by sample and hold circuit 36b while sample and hold circuit 36a is caused to sample and hold the $V_0$ level. This causes the signal output of difference amplifier 36c, namely $\Delta V$, to equal $V_1-V_0$. Conventional circuit designs may be employed to produce this mode of operation. It will be appreciated that this describes one procedure for establishing a point of reference and that other procedures may be employed as deemed appropriate for any given implementation. A-to-D converter circuit 34 operates to digitize the $\Delta V$ signal.

At the time that the $V_1-V_0$ signal appears at the output of circuit 36, it begins to be immediately integrated by integrator circuit 38. This is conveniently referred to as up integration. The integration time is established by control logic 44 in a manner which will be explained in more detail later.

The up integration is allowed to proceed for the time interval established by control logic circuit 44 at the conclusion of which control logic circuit 44 operates switch 40 to the broken line position. At this same time, the output of integrator circuit 38 will be at a level which is proportional to the magnitude of the $V_1-V_0$ signal and therefore representative of the sensed temperature.

By now integrating in the opposite direction, (down integration) and measuring the time interval it takes to return to the zero reference, this time interval measurement will represent temperature.

The disclosed circuit provides a convenient way to obtain the temperature measurement on a desired temperature scale, either Centigrade or Fahrenheit. Since the sensed temperature measurement as provided by the $\Delta V$ signal represents the sensed temperature in terms of absolute temperature (i.e. degrees Kelvin), the presentation of the temperature on either the Fahrenheit or Centigrade scale requires at least the inclusion of a temperature offset. In the case of Fahrenheit, a scale factor conversion is required as well.

Associated with control logic 44 is a selector switch 54 which may be operated to select the measurement in terms of either the Fahrenheit or the Centigrade scale. Control logic circuit 44 contains stores of the appropriate offset factor for each of these two scales. The control logic operates such that the offset is introduced into counter circuit 50 as a preload, preparatory to the down integration.

The A-to-D conversion of the integrator output signal comprises control logic circuit 44 gating pulses from clock 24 through to counter circuit 50 as the down integration is conducted. Since the time duration for the down integration is representative of the sensed temperature, the number of counts which are counted by counter circuit 50 during this time interval are representative of temperature.

In order to yield a measured count so that the pulses counted are at the correct scale factor, the duration for which the up integration is conducted is controlled by control logic circuit 44. Specifically in the case of a Fahrenheit scale measurement, the duration of the up integration is allowed to proceed for a given number of clock pulses, say $N_1$ for example, such that during the down integration, the actual number of clock pulses $N_F$ which are counted by counter circuit 50, when added to the preloaded offset for that temperature scale causes the measurement provided by counter 50 to provide the measurement in terms of degrees Fahrenheit.

Similarly, in the case of the Centigrade scale, the up integration is allowed to proceed for a predetermined number of clock pulses, $N_2$ for example, such that during the down integration, the number of clock pulses $N_c$ counted by counter circuit 50, when added to the preloaded offset for that scale, yields the Centigrade temperature.

It can be appreciated that because the scale factors of the Centigrade and Fahrenheit scales are in the ratio of five to nine, the ratio of the respective numbers $N_2$ and $N_1$ will also be in that same ratio. The timing intervals established by control logic 44 for controlling the respective time durations of the up integrations can be obtained by counting clock pulses. The control of switch 40 and of the preloading and the gating of pulses to counter circuit 50 are also controlled by conventional circuits of the control logic.

The auto zero circuit 46 is a conventional design which is associated with the operational amplifier of integrator circuit 38 to essentially eliminate the effect of offset both in the sample and hold circuits and the integrator. Since at the starting condition, i.e. $\Delta V=0$, the output of integrator circuit 38 is at the reference level, and since it is also the return to this level which is sensed during the down integration to stop counter 50, a store is provided in the auto zero circuit for storing this reference and maintaining it at the reference input to comparator 48. Also associated with the integrator circuit is a reset 56 which is momentarily operated by control logic 44 just prior to commencement of a digitizing operation to ensure integrator reset.

Once the measured count is latched by circuit 52, it is possible to repeat the measurement by the same procedure. The control logic can determine how often the temperature measurement is updated. When the temperature is to be updated, the counter is reset and the aforedescribed procedure is repeated.

The following principle of operation illustrates how the effect of various outside influences, other than temperature, are eliminated by the present invention.

At $I_1$, $$I_1 = CT^n \exp \frac{e(V_1 - V_g)}{KT}$$

Where K = Boltzmann's Constant, T is temperature Kelvin, e = the magnitude of the charge on an electron, c depends on Carrier mobilities, doping, etc., and details of the particular semiconductor, and $V_g$ is the bandgap voltage.

At current $I_0$, $$I_0 = CT^n \exp \frac{e(V_0 - V_g)}{KT} \text{ at the same temperature.}$$

$V_1$ and $V_0$ are the respective voltages across the diode, $V_1 - V_0 = \Delta V,$ $I_1/I_0 = \exp e\Delta V/KT$ and $\Delta V = KT/e \ln (I_1/I_0)$ All the details of a particular device (with the exception of the bulk resistance of the semiconductor) cancel out in the division including many aging effects.

As can be seen, the measured quantity $\Delta V$ is a function of the ratio $I_1 I_0$ and is linear with absolute temperature. In addition, the characteristics of any particular transistor or diode are cancelled out and this makes it possible for production devices to be fabricated without any special procedures for calibration of sensors and circuits. Indeed, since certain parameters change with age, the invention also eliminates many aging effects which would otherwise occur. Therefore, the invention yields a meaningful improvement in diode thermometers.

Figure 2:
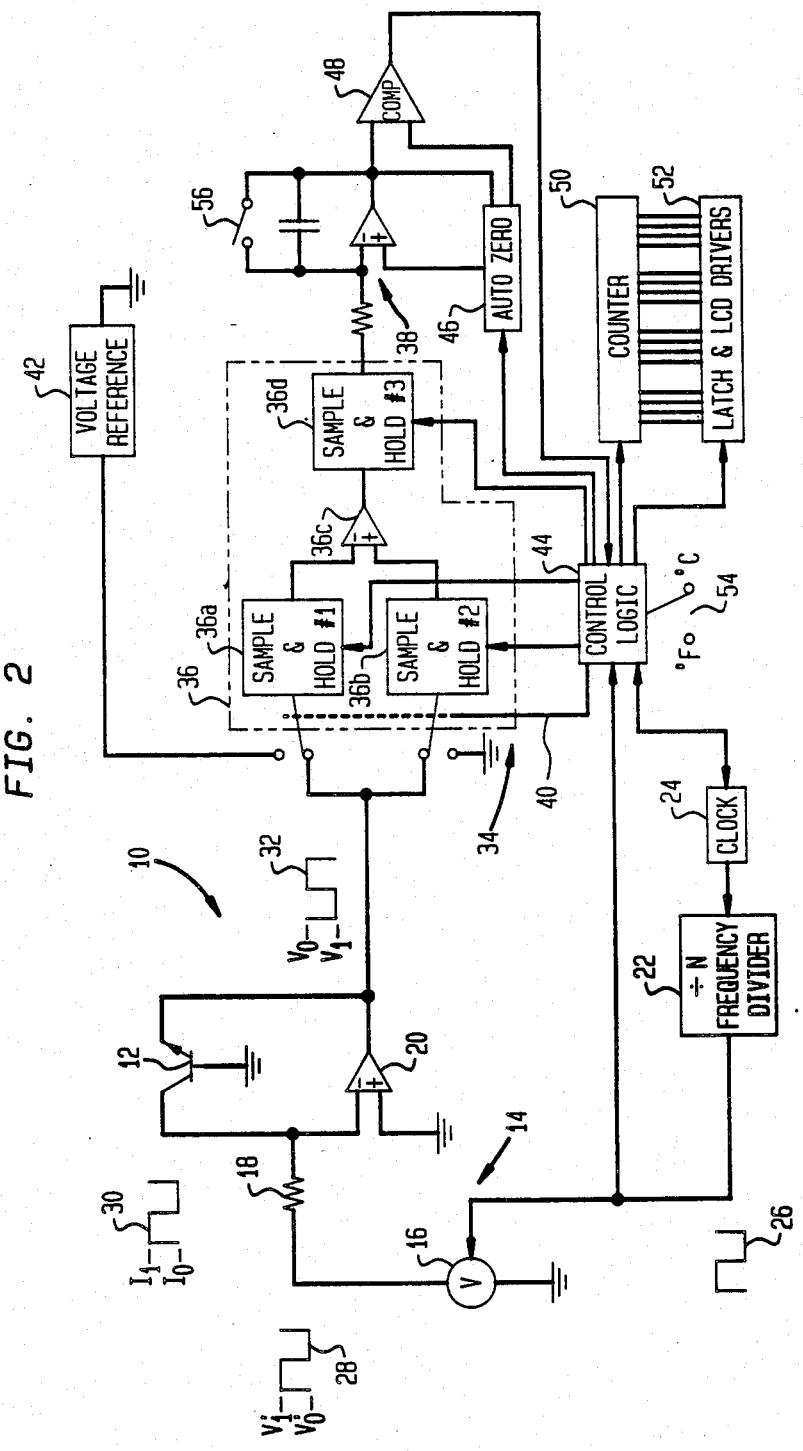
FIG. 2 is a schematic representation of a further embodiment of the invention.

FIG. 2 is a schematic illustration of a further embodiment of the invention which contains a different arrangement of structural components from the embodiment shown in FIG. 1. Correspondingly analogous elements of structure in the two drawing figures are similarly designated.

FIG. 2 shows a third sample-and-hold device 36d coupled at an input thereof to the output of differential amplifier 36c. As described hereinbefore, during the measurement of the temperature, the low level current is conducted through transistor 12, the temperature sensor. In this embodiment, sample-and-hold 36b is strobed, then the high current level is conducted, and sample-and-hold 36a is strobed. Differential amplifier 36c is then strobed, and the output of sample-and-hold 36d is then delivered to up-down integrator 38. The fast charging characteristic of sample-and-holds 36a and 36b obviates the need for extending the time between samples.

FIG. 2 further shows voltage reference 42 being selectably couplable to sample-and-holds 36a and 36b under control of control logic 44. Thus, initialization of the up-down integrator is at least partially achieved by applying the reference voltage as a voltage sampled by the sample-and-hold devices.

Figure 3:
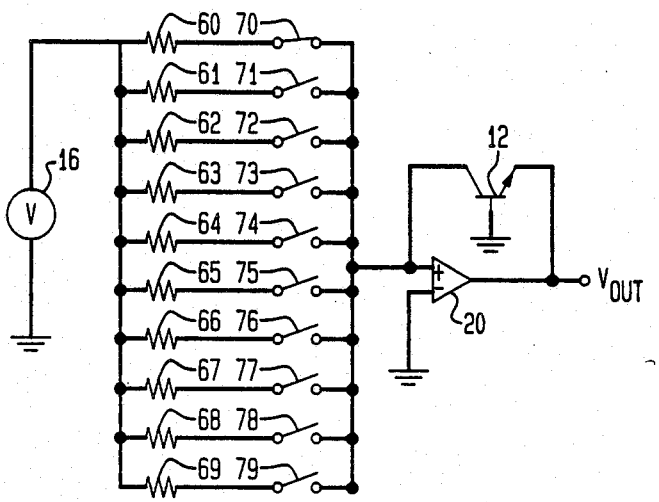
FIG. 3 is a simplified schematic representation of a circuit arrangement for providing current levels having a precisely predetermined amplitude ratio.

FIG. 3 is a simplified schematic representation of a specific embodiment of a current switching aspect of the invention. Elements of structure which correspond to ones of those already described herein are similarly identified. As shown, a switching arrangement formed essentially of ten resistors 60–69 and ten respectively associated switches 70–79 are electrically interposed between voltage source 16 and the combination of transistor 12 and operational amplifier 20. When it is desired to conduct a high level current through the temperature-sensing transistor (12), all of switches 70–79 are closed. However, when conduction of a low level current is desired, fewer than all such switches are closed. In the present embodiment where a ratio of 10:1 is desired between the high and low level currents, only one such switch, illustratively switch 70, is closed during low current level conduction.

In accordance with the invention, a precisely predetermined current ratio of 10:1 is achieved by sequentially closing ones of switches 70–79 during low level conduction. In this manner, the mismatches among the various switches 70–79 and resistors 60–69 are averaged out. Of course, any other such ratio (n:1) can be used in the practice of the invention.

Figure 4:
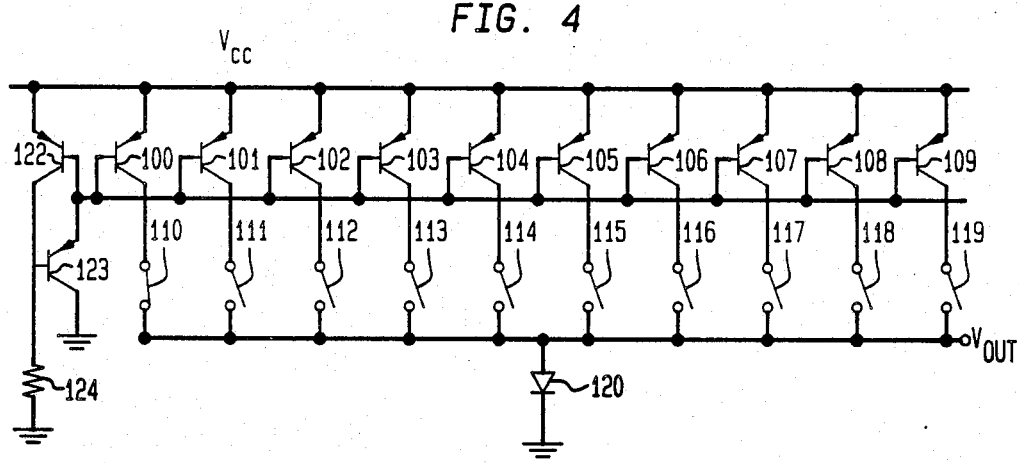
FIG. 4 is a simplified schematic representation of a further current switching arrangement.

FIG. 4 is a simplified schematic representation of another embodiment of the current switching aspect of the invention. In this figure, a plurality of transistors 100–109 are arranged as current sources and are connected at their collectors to respectively associated ones of switches 110–119. The switches are each coupled to a diode 120 which, in this embodiment, performs the function of temperature sensor. There is further provided a transistor 123 which is arranged to minimize the variation in the current through a transistor 122 which determines the bias current in transistors 100–109 as varying numbers thereof are switched on and off. A resistor 124 is coupled at one end thereof to the base terminal of transistor 123 and the collector terminal of transistor 122, and is connected at its other end to a reference potential. As described hereinabove with respect to FIG. 3, the various switches are sequentially closed during low level current conduction to average out any mismatches. In this regard it should be noted that since the base-emitter voltages of the transistors are all identical, their respective conduction currents are substantially equal.

The concept which underlies the embodiments of FIGS. 3 and 4 is that even though reasonable efforts are made to match the circuit components, their characteristics nevertheless deviate from one another by a small amount, for purposes of discussion herein +/− delta. If each element is used once in a cycle consisting of ten subcycles in which, in a subcycle, one circuit element is switched on, and then all of the switching elements are switched on so as to provide, in the disclosed embodiments ten times the conduction, the average of the ten subcycles will only deviate from the desired ratio of ten by a factor of delta squared. Thus, if delta is 2% (0.02), which is well within the state of the art for matched transistors or resistors, the desired ratio of current amplitudes will be achieved to within a factor of delta squared, or 0.04% in this case. For a ratio of currents equal to 10:1, this will result in a 0.04/2.3 (delta squared/ln(10)) percentage error in temperature. At a temperature of 23° C., which corresponds to 300° Kelvin, the intrinsic scale on which the thermometer functions, this would amount to an error of about 0.05° C. Thus, at a given temperature, it is possible to predetermine the voltage that would be obtained by switching the currents. Conversely, by measuring the voltage with an accurately calibrated integrator, as described hereinabove, the temperature can be accurately determined. It is therefore possible under the present state of the circuit component art to provide a temperature sensing system which has a resolution of at least 1° Farenheit or Celsius, without the need for a calibrating reference water bath.

Figure 5A:
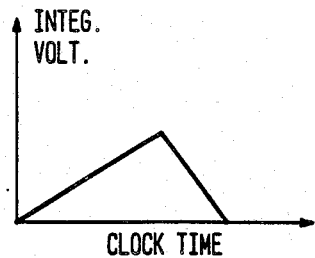
FIGS. 5A, 5B, and 5C are graphical representations useful for describing enhancement of the dynamic range of an integrator.
Figure 5B:
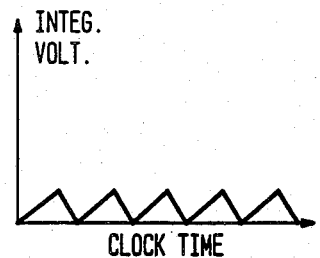
Figure 5C:
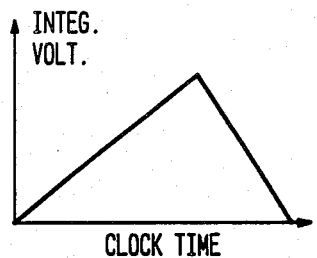

FIGS. 5A, 5B, and 5C are graphical representations which are useful in describing a system whereby the dynamic range of an integrator is increased severalfold. FIG. 5A illustrates the normal characteristic of an integrator, and compares integrator output voltage against time, in terms of clock cycles. FIG. 5B shows the alternating up-down integration, and FIG. 5C shows the characteristic of the equivalent single up-down integration of FIG. 5B.

Although not a very serious one, the major problem with an extended dynamic range is that the time spent integrating is longer, and therefore leakage currents in the integrating capacitor have greater effect. It would appear that the solution to this problem lies in using a larger, lower leakage capacitor. But in fact, there is no problem because the alternating up-down integration reduces leakage. This results from the fact that the average voltage on the integrating capacitor is reduced. Not only is internal leakage reduced, but the linearity of the integrator is improved.

All that is necessary to implement the up-down alternating integration technique is to select a method to switch from up to down integration. A first possible such method utilizes a comparator which switches when the integrator output voltage exceeds a preset value. Noise on the comparator is not a problem because if the up integration is one clock count shorter in one up integration, it will be one count longer in the next integration. A second possible method which may be used when it is possible to estimate the approximate size of the signal (or in this case temperature range) is to preset the number of clock cycles used for each up integration, as well as the total number of clock cycles used for up integrating. In both methods, the correct scale factors are obtained by presetting the total number of counts. In addition, the correct conversion between Fahrenheit and Celsius scales of measurement is achieved by setting the total number of counts for the up integration to have a ratio of 9/5 to 1, respectively. As previously discussed, the offsets between the two temperature scales are set by preloads in the counter.

In a specific illustrative embodiment of the invention which is used as a fever thermometer, an offset voltage may be used in the system which, in effect, subtracts the lower end of the temperature which is not actually used for display purposes. This also has the effect of reducing the dynamic range of the integrator. More specifically, if the thermometer is used as a fever instrument in the range of 32° C. and 42° C., the voltage equivalent to 273°+32° Kelvin can be subtracted as an operational amplifier offset.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention and should not be construed to limit the scope thereof.

What is claimed is:

1. A temperature sensing system comprising:
   solid state temperature sensing means having at least one junction for developing a junction voltage thereacross in response to a current conducted through said solid state temperature sensing means, said voltage being at least partially determined by a temperature of said solid state temperature sensing means;
   current source means for generating said current conducted through said solid state temperature sensing means, said current being conducted in first and second current levels;
   first and second voltage value storage means for storing values of said junction voltage responsive to said first and second current levels, respectively;
   integrator means for receiving a signal responsive to said junction voltages stored in said first and second voltage value storage means and for integrating said signal in a first direction to produce at an output of said integrator means an integration signal proportional to a difference between said junction voltages; and
   means responsive to said integration signal for providing a temperature signal indicative of the temperature sensed by the temperature sensing means.

2. The temperature sensing system of claim 1 wherein said first and second voltage value storage means comprise first and second sample-and-hold means, respectively.

3. The temperature sensing system of claim 2 wherein there is further provided control means for controlling said integrator means and said first and second sample-and-hold means, whereby said first sample-and-hold means stores said junction voltage when said current is conducted at said first current level, and said second sample-and-hold means stores said junction voltage when said current is conducted at said second current level.

4. The temperature sensing system of claim 3 wherein there is further provided voltage reference means for producing a reference voltage with respect to which variations in said junction voltage are measured.

5. The temperature sensing system of claim 3 wherein said integrator means is arranged to integrate in a second direction from said integration signal and there is further provided means for timing said integration in said second direction, said timing means being responsive to said control means.

6. The temperature sensing system of claim 3 wherein there is further provided auto-zero means coupled to said integrator means for compensating for offset voltages.

7. The temperature sensing system of claim 6 wherein there is further provided comparator means having an output for transmitting a signal to said control means, said signal being responsive to said integrator means and said auto-zero means.

8. The temperature sensing system of claim 3 wherein there is further provided selection means in said control means for selecting whether a signal corresponding to temperature is scaled for Fahrenheit or scaled for Celsius measurement.

9. A temperature sensing arrangement of the type which utilizes a thermal characteristic of a solid state device to measure temperature, the arrangement comprising:
   switching means for switching a current conducted through the solid state device from a first current level where a first voltage is produced across the solid state device, to a second current level where a second voltage is produced across the solid state device;
   integrator means for integrating between said first and second voltages across the solid state device; and
   timing means for timing a duration of said integration, said duration of said integration, which is dependant on the temperature being measured, being used to provide a signal corresponding to the sensed temperature.

10. The arrangement of claim 9 wherein there is further provided current control means for maintaining a predetermined magnitude relationship between said first and second current levels (n:1).

11. The arrangement of claim 10 wherein said current control means is arranged to maintain a 10:1 ratio between said first and second current levels, there being further provided a plurality of switch means for switching respective components of said current conducted through the solid state device.

12. The arrangement of claim 11 wherein said current control means further comprises sequencing means whereby said plurality of switch means are sequentially accessed so that any magnitude errors of said current components of said currents are averaged to achieve a high accuracy in said 10:1 ratio.

13. The arrangement of claim 9 wherein said integrator means comprises bidirectional integration means for integrating in first and second directions, said timing means being responsive to time said integration in a predetermined one of said first and second directions.

14. The arrangement of claim 9 wherein there is further provided amplifier means having a predetermined gain and being coupled to the solid state device.

15. The arrangement of claim 9 wherein there are further provided first and second storage means for holding selectable ones of said first and second voltages produced across the solid state device.

16. The arrangement of claim 15 wherein there is further provided third storage means for holding a voltage value responsive to a difference between said voltages stored in said first and second storage means.

17. The arrangement of claim 15 wherein there is further provided amplifier means coupled to said first and second storage means for improving resolution of the temperature sensing arrangement.

18. The arrangement of claim 17 wherein there is further provided switching means for switching input and feedback devices coupled to said amplifier means.

19. A method of measuring temperature comprising the steps of:

alternating conducting a current at first and second current levels through a solid state temperature sensor;

sampling and storing a voltage developed in said solid state temperature sensor at times corresponding to conduction of said current at said first and second current levels;

producing a measurement signal corresponding to a difference in said voltage during conduction of said current at said first and second current levels;

integrating said measurement signal over a predetermined interval of time; and timing at least a portion of said integrating for producing a timing signal corresponding to a sensed temperature of said solid state temperature sensor.

20. The method of claim 19 wherein said step of timing comprises the further steps of:
gating a clock signal to a counter; and
preloading a value in said counter.

21. The method of claim 19 wherein said step of integrating comprises the further steps of:
up-integrating for a period of time which has been predetermined in response to a selected temperature measurement scale; and
down-integrating for a measurement time period which endures until a preselected integration reference voltage is obtained, said measurement time period having a duration responsive to the measured temperature.

* * * * *